United States Patent [19]
Beurrier

[11] 3,832,647
[45] Aug. 27, 1974

[54] SIGNAL DISTRIBUTION NETWORK

[75] Inventor: Henry Richard Beurrier, Chester Twp., Morris County, N.J.

[73] Assignee: Bell Telephone Laboratories, Incorporated, Murray Hill, N.J.

[22] Filed: Nov. 13, 1973

[21] Appl. No.: 415,333

[52] U.S. Cl................ 330/30 R, 307/244, 328/105, 328/153, 330/73, 330/124 R, 330/195, 333/6, 333/8
[51] Int. Cl............................................. H03h 7/48
[58] Field of Search.................... 333/6, 8; 307/244; 328/105, 153; 330/21, 31, 30 R, 56, 57, 73, 124 R, 195

[56] References Cited

UNITED STATES PATENTS

| | | | |
|---|---|---|---|
| 2,860,261 | 11/1958 | Verkruissen | 307/244 |
| 3,097,343 | 7/1963 | Sosin et al | 330/30 R |

*Primary Examiner*—Paul L. Gensler
*Attorney, Agent, or Firm*—S. Sherman

[57] ABSTRACT

This application discloses a distribution network for coupling between a common signal source and a plurality of output loads. One embodiment of such a network comprises a plurality of *n* transistors and an equal plurality of two-winding transformers. The transistors are connected in the common base configuration with the collector of each of the first *n*-1 transistors being connected to the emitter of the next adjacent transistor through the primary winding of a different transformer. The collector of the nth transistor is connected to signal ground through the primary winding of the nth transformer. In accordance with one application of the invention, each secondary winding of the respective transformers is connected to a different output load. In accordance with another aspect of the invention, means are provided for constructively recombining the various output signals from the respective transformers in a common output load. Means are also disclosed for providing an impedance match at both the input and output ports of the network.

11 Claims, 10 Drawing Figures

SIGNAL DISTRIBUTION NETWORK

This invention relates to signal distribution networks.

BACKGROUND OF THE INVENTION

There are numerous applications which involve coupling a common signal source to a plurality of output loads. One example is cable television wherein a program signal, propagating along a coaxial transmission line, is to be coupled to a plurality of subscribers. To accomplish this effectively, the distribution network preferably has a high input impedance relative to the source impedance, and an output impedance that is matched to that of the output loads. A high input impedance causes a minimum disturbance along the source transmission line, while an output match and isolation is provided for the individual loads, thus preventing deleterious interaction between and within them.

In other situations, an impedance match is desirable at either the input and/or output end of the distribution network.

It is, accordingly, the broad object of the present invention to distribute electromagnetic wave energy from a common signal source among a plurality of output loads.

It is a further object of the present invention to distribute said wave energy by means which provide an impedance match at its input and/or output ends.

SUMMARY OF THE INVENTION

A distribution network in accordance with one embodiment of the present invention comprises a plurality of *n* distribution transistors and an equal plurality of *n* two-winding transformers. The transistors are connected in the common base configuration with the collector of each of the first *n*-1 transistors being connected to the emitter of the next adjacent transistor through the primary winding of a different transformer. The collector of the nth transistor is connected to signal ground through the primary winding of the nth transformer. In accordance with one application of the invention, each secondary winding of the respective transformers is connected to a different output load. In accordance with another aspect of the invention, means are provided for constructively recombining the various output signals from the respective transformers in a common output load.

In accordance with a second embodiment of the invention, an output match is provided at each of the distribution network output ports by coupling the network to a common signal source by means of an input transistor connected in the common collector configuration. The common source is connected to the base of the input transistor. The emitter of the input transistor is connected to the emitter of the first distribution transistor through a resistor. A plurality of *n* other match resistors, connected between each of the output loads and the emitter of the input transistor, provide an output impedance match for each of the respective output loads.

In another embodiment of the invention, an impedance-matched amplifier of the type disclosed in my copending application, Ser. No. 113,200, filed Feb. 8, 1971, is used to couple the signal source to the distribution network.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
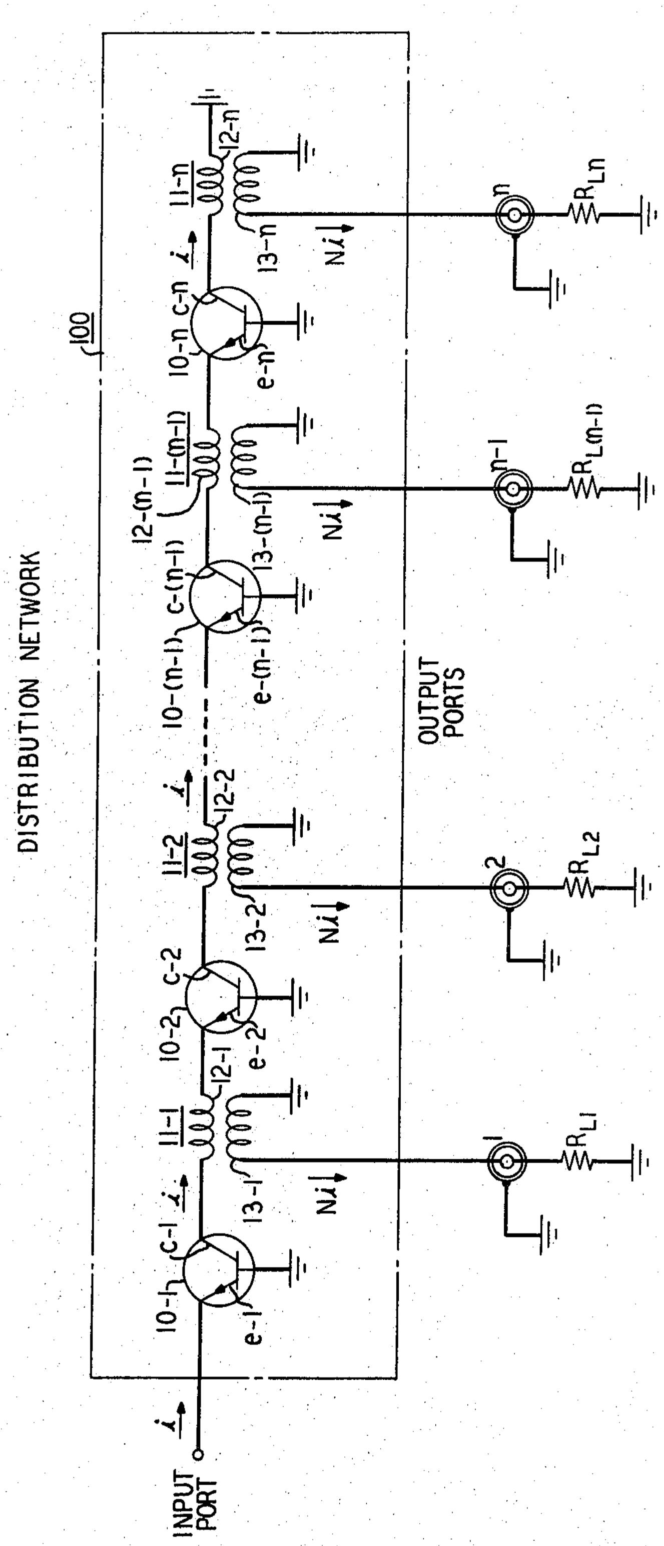
FIG. 1 shows one embodiment of a distribution network in accordance with the present invention.

Referring to the drawings, FIG. 1 shows the basic components of a distribution network 100 in accordance with the present invention. For purposes of illustration and explanation, and to simplify the drawing, the usual direct current bias sources are omitted. The signal portion of the network comprises, as illustrated, a plurality of *n* distribution transistors **10-1, 10-2 . . . 10-*n***, and an equal plurality of *n* transformers **11-1, 11-2 . . . 11-*n*. Each of the distribution transistors 10** is connected in the common base configuration with the collector electrode of the first n-1 transistors connected to the emitter electrode of the next adjacent transistor in the array through the primary winding of a different transformer. Thus, for example, the collector *c*-1 of transistor 10-1 is connected to emitter *e*-2 of transistor 10-2 through the primary winding 12-1 of transformer 11-1. Similarly, at the other end of the array the collector *c*-(*n*-1) of transistor **10-(*n*-1) is connected to the emitter e-n of the nth transistor 10-*n* through the primary winding 12-(*n*-1) of transformer 11-(*n*-1). The collector c-n of the nth transistor is connected to signal ground through the primary winding 12-*n* of transformer 11-*n*. As will be illustrated hereinbelow, alternate circuit arrangements in the collector circuit of the last transistor 10-*n*** in the array can be made.

The terminals of the respective transformer secondary windings **13-1, 13-2 . . . 13-*n*** constitute the output ports of the network. A plurality of n output load resistors $R_{L1}$, $R_{L2}$ . . . $R_{Ln}$ are shown connected to the several output ports.

In operation, an input signal current i injected into the emitter *e*-1 of transistor 10-1 produces an output current $\alpha i$ in collector *c*-1, where $\alpha$ is a number less than one. Advantageously, transistors are selected for which $\alpha$ is as close to one as possible and, for purposes of explanation, is assumed to be equal to one so that the current through primary winding 12-1 of transformer 11-1 and into the emitter *e*-2 of transistor 10-2 is also equal to $i$. This causes an output current Ni to be induced in the secondary winding 13-1 of transformer 11-1 which flows into the first output load resistor $R_{L1}$, where N is the transformer turns ratio.

The above-described process is repeated in each of the successive transistors in the array. That is, an emitter current $i$ injected into each of the transistors in the array produces a collector current $i$ which, upon flowing through the primary winding of the associated transformer, induces an output current Ni in the respective output loads.

Figure 2:
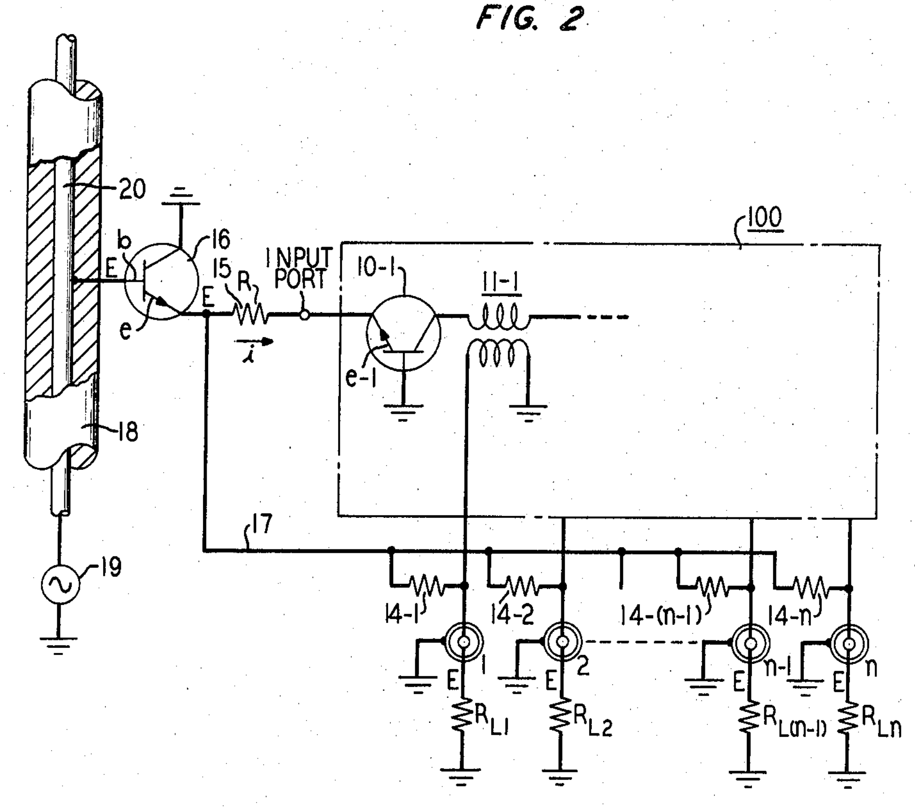
FIG. 2 shows an arrangement for providing an impedance match at the output ports of the distribution network of FIG. 1.

It will be noted in FIG. 1 that the output impedance at each of the output ports 1, 2 . . . $n$ of distribution network 100 is very high, being equal to the collector impedance of the associated distribution transistor divided by the transformer turns ratio N. Since, in general, this will not provide an impedance match for the respective output loads, spurious signals originating in any one of the output loads will be reflected back and forth between the distribution network and the respective load causing echoes and other deleterious results. Obviously, such a mismatch is undesirable and is advantageously avoided by providing an impedance match at each of the output ports. One arrangement for so doing is illustrated in FIG. 2 wherein the input port of distribution network 100 is coupled to a common signal source by means of an input stage, including a transistor 16 connected in the common collector configuration. For purposes of illustration, the common source is shown to be a coaxial transmission line 18 driven at one end by means of a transmitter 19, as would be the case in a cable television system (CATV). The base electrode $b$ of transistor 16 is coupled to the center conductor 20 of transmission line 18. The emitter electrode $e$ of transistor 16 is connected to the emitter $e$-1 of the first distribution transistor 10-1 through a resistor 15. In addition, each of the output ports is connected to the emitter of transistor 16 through impedance matching resistors 14-1, 14-2 . . . 14-$n$ by means of a common conductor 17.

In operation, a voltage E at the base $b$ of transistor 16 produces a voltage approximately equal to E at the emitter $e$ of transistor 16. The resulting current i that flows from emitter $e$ to emitter $e$-1 of the first distribution transistor 10-1 is equal to the emitter voltage E divided by the sum of the resistance R of resistor 15 and the emitter resistance of transistor 10-1. Since the magnitude of resistor 15 will typically be somewhere between 50 ohms and several hundred ohms whereas the typical emitter resistance of a transistor is of the order of fractions of an ohm, the emitter resistance can, for all practical purposes be neglected. When this is done, the emitter current is given by $$i = E/R \qquad (1)$$

This current, flowing into the emitter $e$-1 of transistor 10-1, produces an output current in each of the loads as explained hereinabove in connection with FIG. 1. If, for purposes of explanation, we specify that the transformer turns ratio N is unity, and that the resistance of the output loads is equal to the resistance R of resistor 15, the output current flowing into each load is also equal to $i$, and the resulting voltage across the output loads is equal to the input voltage E. As a result, the net voltage across each of the resistors 14-1, 14-2 . . . 14-$n$ is zero and none of the output current flows through these resistors. However, if for any reason a spurious signal is emitted by one of the loads, (such as where a component of local oscillator voltage leaks by the input terminals of a television receiver connected to network port 1) resistor 14-1 would serve as a termination. In particular, the terminal impedance at output port 1 (and, correspondingly, at each of the other output ports) comprises the resistance of resistor 14-1 in series with the emitter impedance of transistor 16, both of which are in parallel with the coupled impedance induced in the secondary winding 13-1 of transformer 11-1. Since the latter includes the collector impedance of transistor 10-1, it is very much larger than the resistance of resistor 14-1 and can be neglected. Similarly, the emitter resistance of transistor 16 is very much smaller than that of resistor 14-1 and can also be neglected. Thus, the output impedance at port 1 of distribution network 100 is essentially equal to the resistance of resistor 14-1, and provides an impedance match when this resistance is made equal to $R_{L1}$. So terminated, spurious signals originating in the load are totally absorbed by resistor 14-1. This, of course, is equally the case at all of the other network output ports.

While the distribution network illustrated in FIG. 2 is matched at its output ports by means of the circuit in which it is embedded, the input transistor 16 does not provide an impedance match to transmission line 18. To the contrary, the base electrode provides a high impedance and, as a result, substantially no power is extracted from line 18. However, there are applications wherein an input match is preferred. For such applications, an input circuit of the type illustrated in FIG. 3 can be employed.

Figure 3:
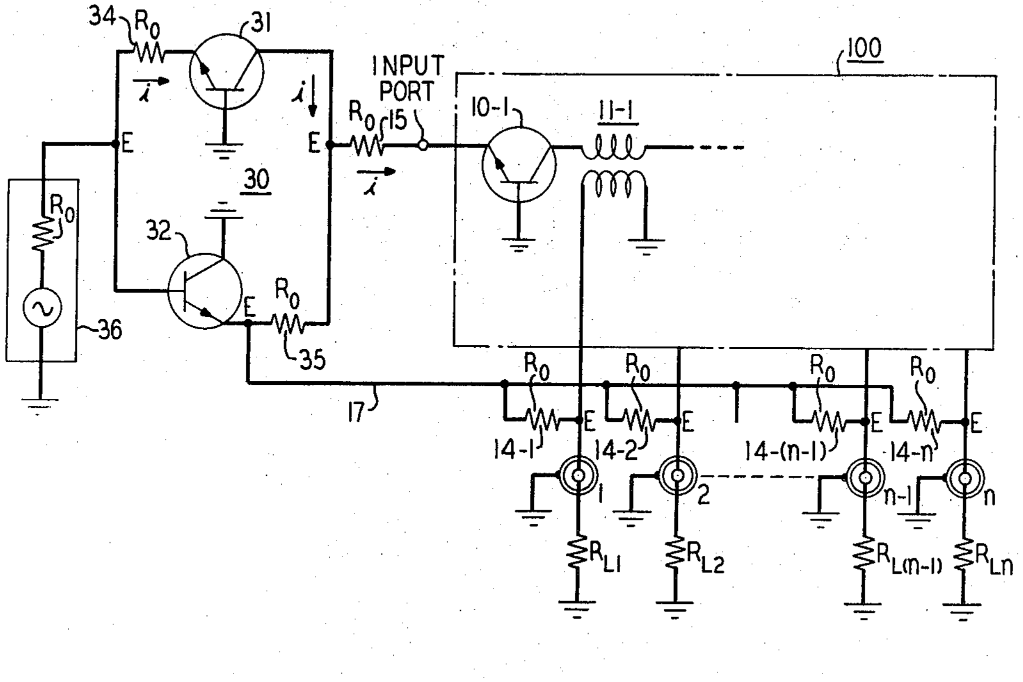
FIG. 3 shows an input circuit for use with the distribution network of FIG. 1 which provides an input impedance match.

In the embodiment of FIG. 3, input transistor 16 is replaced by an amplifier 30 of the type described in my copending application Ser. No. 113,200, filed Feb. 8, 1971. This particular matched amplifier comprises two parallel-connected wavepaths each of which includes an amplifying stage. The terminal impedances of the stages are such that the input impedance of one stage is very much greater (preferably an order of magnitude greater) than the source impedance, whereas the input impedance of the other stage is much less (preferably an order of magnitude less) that that of the source. A similar relationship exists with respect to the relative output impedances of the two stages and the output load impedance. For purposes of illustration, one of the stages is a transistor 31 connected in the common base configuration. Such a stage is characterized by a very small input impedance and very high output impedance. The other stage is a transistor 32 connected in the common collector configuration which is characterized by a very high input impedance and a very low output impedance.

At the input end, a common signal source 36, having an output resistance $R_o$, is connected to the base of transistor 32, and through a matching resistor 34 to the emitter of transistor 31.

At the output end of the amplifier, a common output load resistor 15 is connected to the collector of transistor 31, and to the emitter of transistor 32 through an output matching resistor 35.

Conductor 17, to which the distribution network output matching resistors 14 are connected, is connected to the emitter of transistor 32.

Designating the source resistance as $R_o$, and assuming a 1:1 turns ratio for transformers 11, the embodiment of FIG. 3 is matched at the input end and at the output end of amplifier 30, and at the output ports of distribution network 100 when resistors 34, 35, 15, 14 and the output loads are all equal to the source resistance $R_o$. So proportioned, an input voltage E at the input end of amplifier 30 produces a voltage E at the emitter of transistor 32 and a current $i = E/R_o$ in the collector of transistor 31. The latter current flows through resistor 15 and into the distribution network, producing an output current $i$ at each of the network output terminals. These currents flow through the respective loads generating an output voltage E at each port. Since there is no net voltage across output matching resistors 14, there is no signal current flow through these resistors. Similarly, there is no net voltage across resistor 35, and hence, no signal current flows through this resistor. These resistors, therefore, absorb no signal power but serve, respectively, as a match-termination for the loads connected to the distribution network and for the load connected to the amplifier. Resistor 34, which does absorb input signal power, serves as a match-termination for the signal source.

The embodiment of FIG. 3 can be modified in one respect to provide an additional output port. The modification involves replacing resistor 15, which absorbs the output power from amplifier 30, with a transformer in the manner illustrated in FIG. 4A. In this figure which shows the output end of amplifier 30 and the input end of network 100, resistor 15 is replaced by a transformer 40 and an output load $R_{L(n+1)}$. In particular, the transformer primary winding 41 is connected in series between the amplifier output port and the input port of network 100. The terminals of the transformer secondary winding comprise the output port to which the $n + 1^{st}$ load $R_{L(n+1)}$ is connected. In this manner, the amplifier output power can be productively utilized. In all respects, however, the circuit of FIG. 4B operates the same way as the embodiments of FIGS. 3 and 4A. The advantage of the embodiment of FIG. 4B is that it uses one less transistor than that required in FIG. 3 for the same number of output ports.

In the illustrative embodiment of FIG. 1, a signal propagating along transmission line 18 is shown coupled to a plurality of loads. As was also indicated, transmission line 18 can be a CATV transmission line and the various loads can be individual television receivers.

Figure 4A:
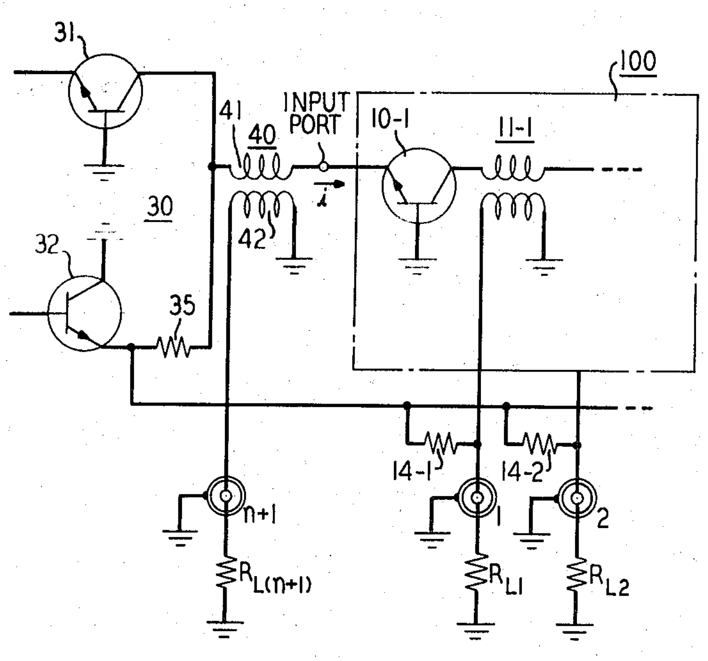
FIGS. 4A and 4B show modifications of the input circuit of FIG. 3.
Figure 4B:
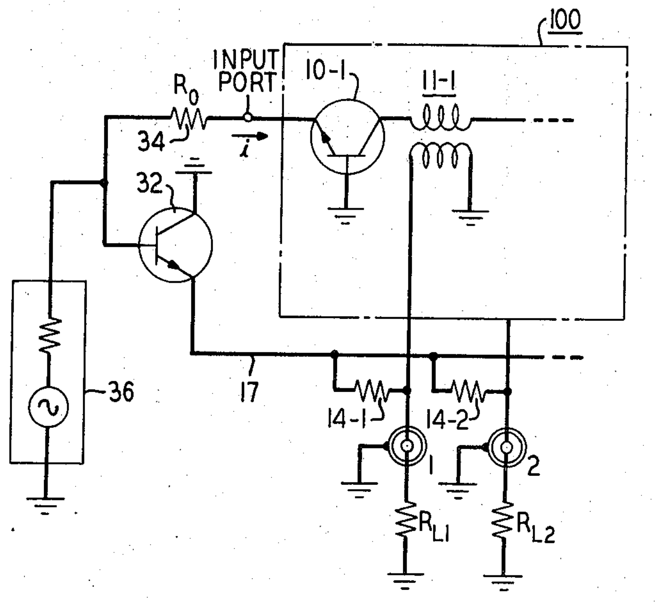

The embodiment of FIGS. 3, 4A and 4B can be used to excite a multielement antenna array where each of the output loads is an element of the array.

Figure 5:
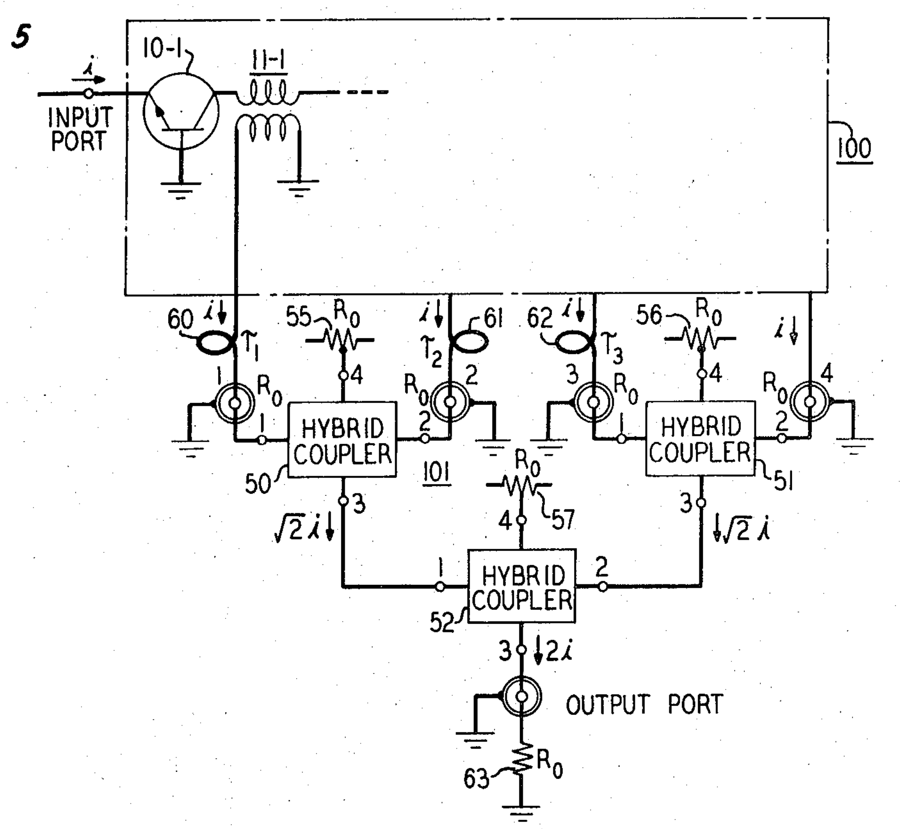
FIG. 5 shows, in block diagram, a recombining network for constructively recombining the output signals from the distribution network illustrated in FIG. 1.

In a third application of the invention, now to be considered, the outputs from the distribution network are constructively recombined in a common load to provide power gain. One such arrangement is illustrated in FIG. 5 which shows a four-port distribution network 100 to which there is connected a hybrid-coupled fan-in recombining network 101 comprising three hybrid couplers 50, 51 and 52. As is known, a hybrid coupler is a four-port device having two pairs of conjugate ports 1-2 and 3-4. In FIG. 5, port 1 of coupler 50 is connected to the network output port 1 and conjugate coupler port 2 is connected to network output port 2. Similarly, conjugate ports 1 and 2 of coupler 51 are connected to network output ports 3 and 4, respectively.

Conjugate ports 1 and 2 of coupler 52 are connected, respectively, to port 3 of coupler 50 and port 3 of coupler 51. Port 3 of coupler 52, which is also the output port of the recombining network, is connected to an output load 63. Port 4 of each coupler is terminated by means of a matching resistor 55, 56 and 57.

Recognizing that the signal experiences a finite delay as it propagates through each of the transistortransformer pairs that comprise the distribution network, time delay equalizing networks 60, 61 and 62 are included in the first three output branches of the distribution network. The phase of the distribution network output signals coupled to the recombining network will depend upon the type of hybrid couplers employed. If quadrature couplers are used, the signals coupled to the respective couplers will have a 90-degree relative phase. If the so-called in-phase couplers are used, the signals will either be in-phase or 180° out of phase, depending upon how the coupler connections are made. In any case, phase shifters (not shown) will be included, as required, to produce a constructive recombination of the signal components in the output load.

In operation, a current $i$ is derived from each of the outputs ports of the distribution network 100 in the manner described hereinabove. Because of the impedance match, these currents combine in couplers 50 and 51 to produce an output current $2i$ in each of the input ports 1 and 2 of coupler 52. These, in turn, are combined to produce an output current 2i in output load 63. The output power delivered to load 63 is, therefore, $(2i)^2R_o$ which is the sum of the power delivered at ports 1, 2, 3 and 4 of the distribution network, i.e., $(4)(i)^2R_o$. Thus, a distribution network in accordance with the present invention can be used in conjunction with a suitable recombining network to obtain power gain.

Figure 6:
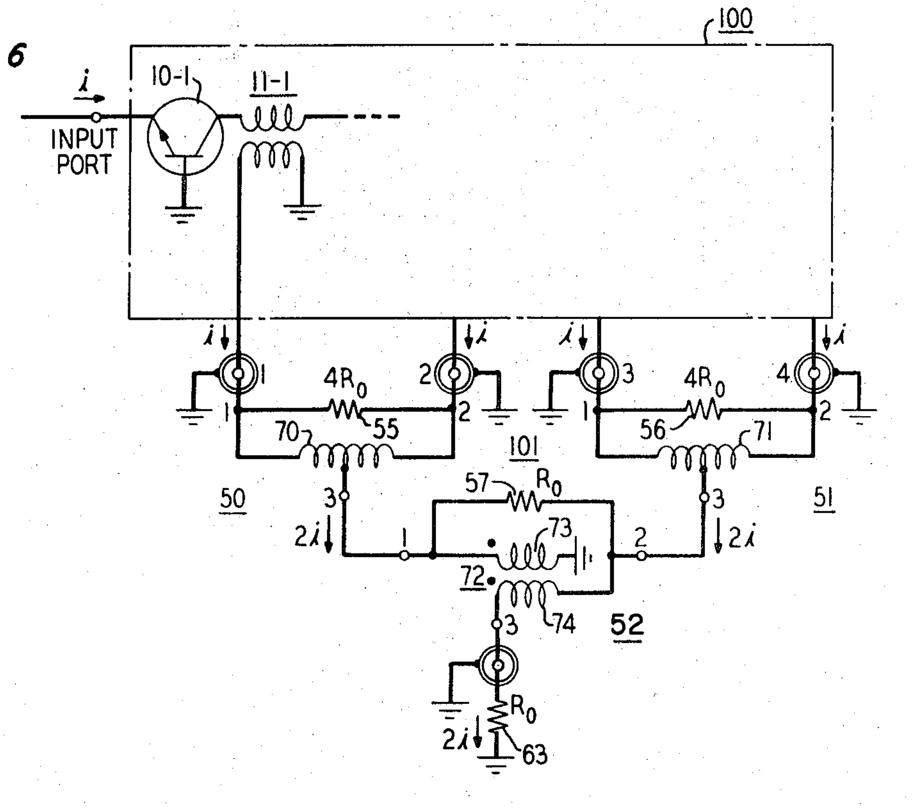
FIG. 6 shows a specific embodiment of a recombining network.

FIG. 6, included for purposes of illustration, shows a specific embodiment of recombining network 101 using a particular arrangement of simplified transformer hybrid couplers. In this embodiment hybrid couplers 50 and 51 comprise center tapped inductors 70 and 71, respectively. The ends of inductor 70 are connected to output ports 1 and 2 of distribution network 100. Similarly, the ends of inductor 71 are connected to output ports 3 and 4 of distribution network 100. Matching resistors 55 and 56 are connected between the ends of inductors 70 and 71, respectively.

The third hybrid coupler 52 comprises a 1:1 turns ratio transformer 72. One end of one transformer winding 72 is connected to the center tap along inductor 70. The other end of winding 73 is at signal ground. One end of the other transformer winding 74 is connected to the center tap along inductor 71. The other end of winding 74 is connected to the output load 63. Matching resistor 57 is connected between the two center taps.

Designating the resistance of the output load as $R_o$, the relative magnitudes of terminating resistors 55, 56 and 57 in this embodiment are $4R_o$, $4R_o$ and $R_o$, respectively.

Figure 7:
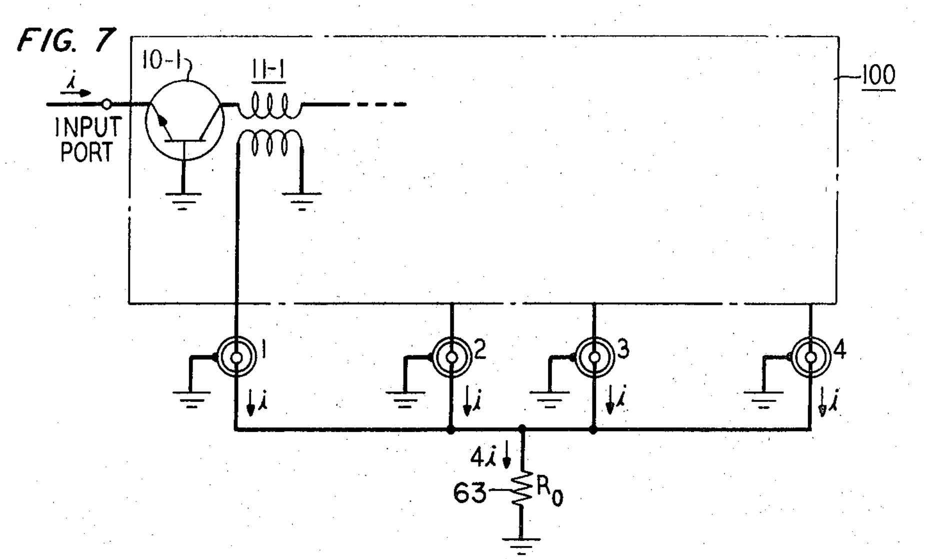
FIGS. 7 and 8 show alternate recombining networks.

Both the generalized recombining network illustrated in FIG. 5 and the particular recombining network illustrated in FIG. 6 will provide an impedance match at the output load whenever the distribution network is matched at its output ports, as explained in connection with FIGS. 2 and 3. If, on the other hand, an output match is not required, a simpler recombining network can be used, such as is shown in FIG. 7. In this embodiment, the distribution network output ports are simply connected in parallel with the common output load 63. For purposes of illustration, a four-port distribution network is shown in which case the total current in the output load is 4i and the network delivers 16 unit watts (i.e., 16 $i^2R_o$). This, in turn, requires that each of the four transistors in the distribution network delivers 4 unit watts to the output load.

Figure 8:
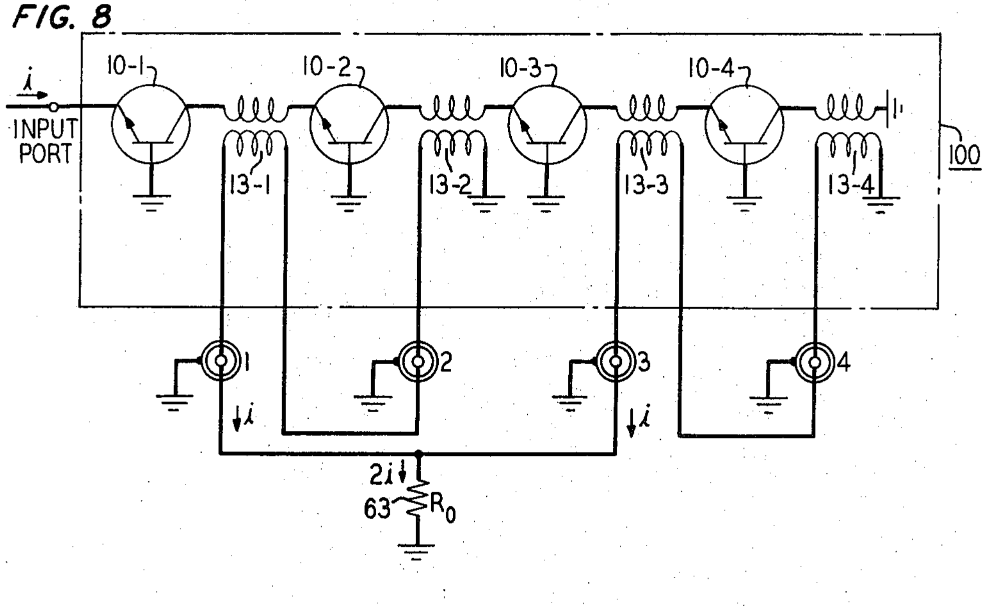

Other output arrangements, such as the one shown in FIG. 8, can be made. In this configuration, the output ports of the distribution network are connected in a series parallel arrangement. For example, as illustrated in FIG. 8, secondary windings 13-1 and 13-2 are connected in series by connecting output port 2 to the end of secondary winding 13-1 that is shown grounded in FIG. 1. Similarly, secondary windings 13-3 and 13-4 are connected in series by connecting output port 4 to the end of secondary winding 13-3 that was previously grounded. The other ends of secondary windings 13-1 and 13-3, (i.e., output ports 1 and 3) are connected in parallel with output load 63.

In operation, output current *i* from ports 1 and 3 combine, in phase, in output load 63. In this arrangement, 4 unit watts are delivered to the load for an average of one unit watt per transistor. Thus, by a combination of series and parallel connections among the various stages in the distribution network, the power delivered to the output load, and the power contributed by the several transistors can be controlled in accordance with the power needs of the load and the power capability of the available transistors.

While not specifically mentioned, it is recognized and understood that in each case, time and/or phase equalization networks will be included, if required, such that the currents recombine constructively in the output load.

Figure 9:
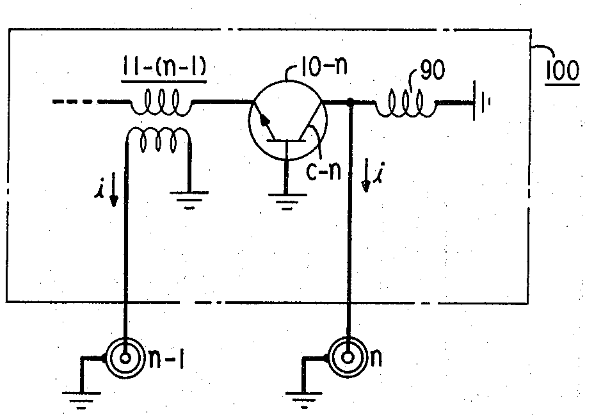
FIG. 9 shows a modification in the collector circuit of the last transistor in the distribution network.

As indicated hereinabove, the collector circuit of the last distribution transistor 10-*n* can be modified from that shown in FIG. 1. It will be recalled from the description of the operation of the distribution network that the signal current *i* flows through each of the transistors in the distribution network and induces a current proportionate thereto at each of the output ports. However, the collector current in the last transistor 10-n in the array is not called upon to flow through any additional transistors and, hence, can be coupled directly into the last output port. Such an arrangement is illustrated in FIG. 9 which shows the last transistor 10-*n* in distribution network 100 with its collector electrode c-n connected directly to output port *n*. An inductor 90, shown connected between collector *c-n* and signal ground, would typically be included as part of the direct current bias circuit. Thus, in all cases it is understood that the above-described arrangements are illustrative of a small number of the many possible specific embodiments which can represent applications of the principles of the invention. Numerous and varied other arrangements can be readily devised in accordance with these principles by those skilled in the art without departing from the spirit and scope of the invention.

What is claimed is:

1. A distribution network for coupling between a common signal source and n output ports comprising:

an array of *n* distribution transistors connected in the common base configuration and a plurality of *n*-1 two-winding transformers;

the emitter of the first of said transistors of said array constituting the input port of said network;

the collector of each of the first *n*-1 transistors in said array being connected to the emitter of the next adjacent transistor through the primary winding of a different one of said transformers;

the secondary windings of said transformers being connected to n-1 of said output ports; and means for coupling the collector of the last of said transistors to the nth output port.

2. The network according to claim 1 wherein said means for coupling the collector of said last transistor to said nth port comprising an nth two-winding transformer;

wherein the collector of said last transistor is connected to signal ground through the primary winding of said nth transformer;

and wherein the secondary winding of said nth transformer is connected to said nth output port.

3. The network according to claim 1 including, in addition, an input stage connected between said common signal source and the emitter electrode of said first transistor.

4. The network and input stage according to claim 3 wherein said input stage comprises:

an input transistor connected in the common collector configuration;

the base electrode of said input transistor constituting the input port of said stage;

means, including a series resistance, for connecting the emitter electrode of said input transistor to the emitter electrode of the first distribution transistor; and a plurality of *n* matching resistors connected, respectively, between said *n* output ports and the emitter of said input transistor.

5. The network and input stage according to claim 3 wherein said input stage comprises:

an input transistor connected in the common collector configuration;

the base electrode of said input transistor constituting the input port of said stage;

means, including a series resistance, for connecting the base electrode of said input transistor to the emitter electrode of the first distribution transistor; and a plurality of *n* matching resistors connected, respectively, between said *n* output ports and the emitter of said input transistor.

6. The network and input stage according to claim 3 wherein said input stage comprises:

first and second parallel-connected signal paths;

said first path including, in cascade, a matching resistor and a first transistor connected in the common base configuration;

said second path including, in cascade, a second transistor connected in the common collector configuration and a matching resistor;

the junction of said first matching resistor and the base electrode of said second transistor constituting the input port of said input stage;

the junction of said second resistor and the collector electrode of said first transistor constituting the output port of said input stage;

resistive means for coupling the output port of said input stage to the input port of said distribution network; and a plurality of *n* matching resistors connected, respectively, between said *n* output ports and the emitter of said second transistor.

7. The network and input stage according to claim 6 wherein said resistive means comprises a twowinding transformer wherein the output port of said input stage is connected to the input port of said distribution network through the primary winding of said transformer;

and wherein the terminals of the secondary winding of said transformer constitute an additional output port.

8. The distribution network according to claim 1 including means for constructively recombining the signals in the output ports of said network.

9. The network according to claim 8 wherein said means for recombining comprises a hybrid-coupled fan-in.

10. The network according to claim 8 wherein said means for recombining comprises connecting said output ports in parallel.

11. The network according to claim 8 wherein said means for recombining comprises connected groups of transformer secondary windings in series, and connecting said series-connected groups of windings in parallel.

* * * * *